B. WALKER.
Bolt Heading Machine.

No. 59,100. Patented Oct. 23, 1866.

WITNESSES:

UNITED STATES PATENT OFFICE

BENJ. WALKER, OF BIRMINGHAM, CONNECTICUT.

IMPROVEMENT IN BOLT-HEADING MACHINES.

Specification forming part of Letters Patent No. 59,100, dated October 23, 1866.

*To all whom it may concern:*

Be it known that I, BENJAMIN WALKER, of Birmingham, in the county of New London and State of Connecticut, have invented certain new and useful Improvements in Bolt-Machines; and I do hereby declare that the following is a full, clear, and exact description of the same, reference being had to the accompanying drawings, in which—

Figure 1:
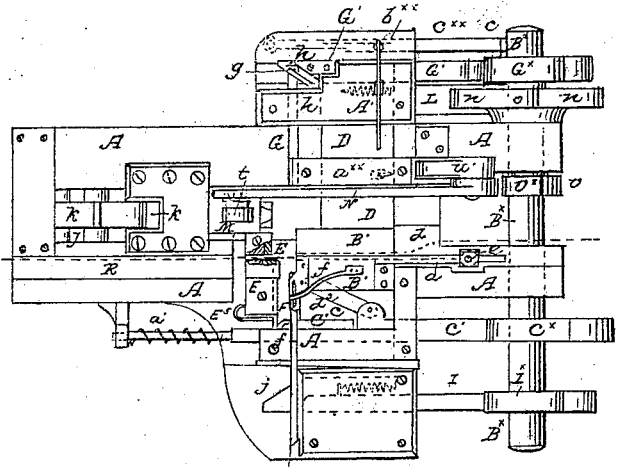
Figure 2:
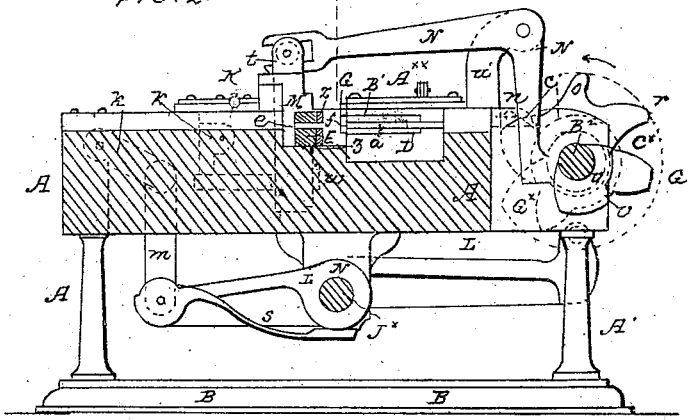
Figure 3:
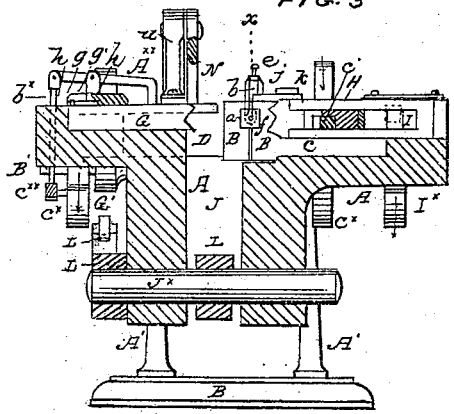
Figure 4:
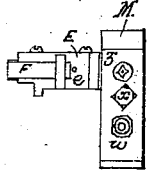

Figure 1 is a plan or top view. Fig. 2 is a vertical longitudinal section taken in the line *x x*, of Figs. 1 and 3. Fig. 3 is a vertical section taken in the line *y y* of Figs. 1 and 2. Fig. 4 is a detached view of a portion of the invention.

Similar letters of reference indicate corresponding parts in both figures.

This invention consists in certain novel means whereby the accurate feeding of the rod to the machine and the cutting of the same into uniform lengths is effectually secured, and whereby solid and well-finished heads are formed upon the bolts without injuring the shape of their smaller ends, the invention being applicable to bolts having heads of any desired pattern, and being capable, when desired, of forming heads upon the ends of rods or bolts of any length.

To enable others to understand the construction and operation of my invention, I will proceed to describe it with reference to the drawings.

A represents a solid frame of cast-iron, which supports the working parts of the machine, and is itself supported by four posts, A', which rest upon a suitable base, B.

C and D are two flat horizontal slides, which work in transverse guides formed in the upper surface of the frame A, at the central part thereof. Formed upon the inner end of each of the slides is a head, B', and formed longitudinally in the face or inner side of each of these heads is a recess, *a*, which is semi-circular in its cross-section, the said recesses holding the bolt during the operation of cutting off the same, as will be hereinafter fully set forth. Projecting back from the rearmost end of the head B' of the slide C is a horizontal arm, *b*, on which is placed an adjustable block, *c*. This adjustable block is furnished at its lower end with a rod, *d*, the forward end of which projects into the recess *a* of the said head and acts as a stop to gage the length of the blank to be cut off previous to the heading operation, as will be presently explained.

C' is a reciprocating slide, which is situated over the outermost portion of the slide C and transversely thereto, the said slide C' working in suitable guides formed longitudinally on the frame and receiving a forward movement from a cam, C*, which is secured upon a transverse shaft, B*, situated at the rearmost end of the frame A, the backward movement of the slide C' being produced by a spiral spring, *a'*, coiled around its forward end, and which acts upon it when released from the action of the cam C*. The forward end of the head B' of the slide C is connected with the central part of the slide C' by means of a toggle-bar, *d**, in such manner that when the slide C' is pushed forward the slide C will be forced inward, and when the said slide C' is moved back, as just set forth, the slide C will be moved outward toward the side of the frame A.

A spiral spring is placed behind the slide D in such a way as to push it inward when required; and formed upon the upper surface of the said slide is a spur, *a*, the upper outer surface of which is made sloping or inclined. A is a transverse lever, which is pivoted near its center in a suitable bearing formed upon the upper side of the frame A. The innermost end of this lever has a catch formed upon it in such manner as to catch upon the spur *a* and hold the slide D back in a stationary position while the slide C is being moved back to discharge the finished bolt from the machine, and also during the feeding of the rod thereto, the outer end of the aforesaid lever A being connected by a connecting-rod, *b***, with a longitudinal lever, *c**, situated underneath the outer edge of one side of the frame A, and operated by means of a pin or stud, *c***, projecting laterally from the outer side of the cam G*.

E is a block, which is fixed upon the frame A, and has formed in it a horizontal tapering hole, $e$, which is situated longitudinally with regard to the said frame, and through which the rod from which the bolts are formed is fed into the machine.

Sliding in a groove formed lengthwise in the inner side of the block E is a cutter, F, which is placed edgewise in the said groove. This cutter F is forced inward by a short inclined plane, $f$, formed upon the inner side of the slide C' and near the forward end thereof, the outward motion of the said cutter F being derived from a bent spring, E', attached to one end of the block E.

Situated in a deep groove or guide formed transversely in one side of the frame A, and just in front of the slide D, is a sliding bar, G, which has a heading-die, $f'$, formed upon its inner end, as shown in Fig. 3, and receives a reciprocating movement through the agency of another bar, G', which is placed in longitudinal guides near one edge of the frame A and receives a reciprocating movement from the revolutions of a cam-wheel, G*, on the shaft B*, the sliding bar G being pressed back against the said cam-wheel by a spiral spring, (shown in dotted lines in Fig. 1,) and the forward end of the said bar G' being connected with the sliding bar G by means of a pin, $g$, which passes up through an inclined slot, $g'$, formed in a horizontal plate, $h$, secured upon the forward end of the sliding bar G', as more clearly shown in Fig. 1.

H is a transverse sliding bar, similar to the bar G, situated exactly in line therewith, and furnished at its inner extremity with a heading-die, $f'$, in the same manner. The inward movement of this bar H is derived from a longitudinally-sliding bar, I, working in longitudinal guides at that side of the frame A opposite the other longitudinally-sliding bar, G, and having its forward end shaped into an inclined plane, $i$, which acts upon the end of the transversely-sliding bar H.

The bar I is pressed back by a spiral spring (shown in dotted lines in Fig. 1) against a cam-wheel, I*, on the shaft B*, so that the rotation of the said cam-wheel I* produces a reciprocating motion of the bar I. The backward or outward movement of the sliding bar H is produced by a curved spring, $j$, attached to the head of the slide C and acting upon a pin, $j'$, projecting upward from the said bar H, near the inner end thereof.

Furthermore, it should be mentioned that the central portion of the bar H is furnished with a large slot, $j*$, in its central point, in order to allow the slide C' to pass through it. Formed in the frame A at the innermost end of the fixed block E, and extending longitudinally forward nearly to the front end of the frame, is a vertical slot, J, in which a longitudinally-sliding block, K, is placed, and supported by suitable guides or shoulders formed in the lower part of the said slot J. This sliding block is forced forward, when required, by means of toggle-bars $k$ $k$, situated in the forward portion of the slot J, and operated through the agency of a connecting-rod, $m$, by means of a strong lever, L, the fulcrum of which is formed by a transverse shaft, J*, situated underneath the central portion of the frame A. The said lever is operated by a cam-wheel, $n$ $o$ $r$, secured upon the shaft B*. A suitable spring, $s$, secured to one of the bearings of the shaft J' and acting upon the forward end of the lever J*, forces the said end of the lever downward when released from the action of the cams $n$ $o$ $r$, and consequently moves the sliding block K toward the front end of the frame A. Formed vertically in the rearmost side of the block K is a dovetail groove, into which is fitted the front side of a vertically-sliding block, M. Projecting upward from the upper end of this block M is a spur, $t$, which is furnished with a laterally-projecting pin, on which is placed a square block or washer, $u$. Pivoted on an arm or bracket, $w'$, fixed upon the frame A, is a bent lever, N, the foremost or upper arm of which is forked or slotted at its extremity and fitted upon the block $u$, as represented in Fig. 2, and the rearmost or downwardly-projecting arm of which is acted upon by the cams $v$ and $v*$ of a cam-wheel secured upon the shaft B*. Placed one above the other and projecting back from the rearmost side or face of the vertically-sliding block M are three dies, $z'$ $z$ $w$. The uppermost die, $z'$, is made with four convex inner sides, as shown in Fig. 4, so that the recesses formed in the corners thereof will form sharply-defined corners upon the end of the blank in the operation of heading the same, and the die $z$ is made to correspond with the top or upper side of the head, while the remaining die, $w$, is simply made somewhat concave, the said dies operating in upsetting the end of the blank to form the head of the bolt, as will be presently set forth.

R is a longitudinal groove formed in the upper surface of the frame A, near one edge thereof, and parallel with the slot J, and in which the rod from which the bolts are formed is supported while being fed to the machine.

The iron rod from which the bolts are to be formed, being first heated to a suitable degree, is laid in the groove R, and its inner end is thrust through the hole or opening $e$ until it strikes the end of the gage-rod $d$, whereupon the slide D is moved inward by the means hereinbefore described, so that the end of the rod is clasped between the heads B' of the two slides C D, the said end of the rod being held in the recess $a$ in the inner sides thereof. This being done, the cam C* moves the slide C' forward, so that the inclined plane $f$ forces the cutter F inward to shear off the length of iron required to form the bolt. The slide C being simultaneously forced inward by the toggle-bar $d*$, the opposite slide, D, being also moved along by the movement of the two slides being continued after the blank has been cut from the rod, the said block is carried sidewise until it is brought opposite the vertically-sliding block M, in which position it is retained for a sufficient length of time by the action of the semicircular portion of the cam C*. When this is done the cam $n$ operates the lever J* to force upward the inner end of the toggle-bars $k$ $k$, and thus force the longitudinally-sliding block K forward until the upper die, $z'$, is pressed inward against the forwardly-projecting end of the blank and forces the same down upon the front ends of the heads B', the sharply-recessed corners of the die $z'$ so shaping the end of the blank as to insure the proper forming of the corners of the head, as hereinbefore mentioned. The cam $n$ then releases the lever L, the forward arm of which is brought downward by the spring $s$, and consequently draws the block M away from the aforesaid ends of the head B', whereupon the cam-wheels G* and I* force the sliding bars G' and I forward, so that their inclined forward ends force the sliding bars G and H inward until their inner ends are brought in contact with each other, so that the dies $f'$ each shape one-half of the sides or circumference of the head, the said dies $f$, when in this position, forming a cup or box around the head, and the bars G' and I being moved forward sufficiently to bring their flat inner sides behind the ends of the aforesaid sliding bars G' and I, in such manner as to firmly brace them against the outward pressure exerted upon them in the operation of heading the bolt. The cam $v$ then pushes forward the downwardly-projecting arm of the lever N, so that the forward arm thereof raises the block M sufficiently to bring the central die, $z$, opposite the end of the blank or partially-finished bolt, whereupon the cam $o$ operates the lever L, to again force back the sliding block K, so that the die $z$ is forced into the cup or box formed between the two dies $f'$, as hereinbefore explained, and swages the head into the said box, the corners formed upon the end of the blank by the recessed corners of the aforesaid box, and thus insuring sharply-defined corners on the head of the bolt. The continued rotation of the shaft B* bringing the cam $o$ away from the lever L, the sliding block K, and, of course, the vertically-sliding block M, carrying the dies, are brought away from the head of the bolt, as hereinbefore explained, the cam-wheels G* and I* at the same time allowing the sliding bars G' and C' to move back from behind the sliding bars G and H, and thus allow the said bars, with their dies $f'$, to recede from the head bars of the bolt. The cam $v$* then operates the bent lever N to raise the block M until its lower die, $w$, is brought opposite the head of the bolt, on which the cam $r$, operating the lever L, forces the block K inward and presses the die $w$ upon the head of the bolt to finish the top thereof.

The remaining cams of the cam-wheels I* and G* then force the sliding bars I and G' forward, which again bring the dies $f'$ of the sliding bars G H together, which, by again compressing the sides of the head, smooths and finishes the same. The semicircular portion of the cam C* then leaves the end of the bar C', and allows the said bar to move back, and consequently to bring the slide C away from the slide D and back to its first position, the finished bolt dropping from the recesses $a$ through a suitable opening in the frame A, whereupon the rod is again pushed inward until its end strikes the gage-rod $d$, and the operation is repeated in heading another bolt.

Inasmuch as the end of the rod from which the bolts are formed is not cut off perfectly square by the shearing off of the blanks therefrom, as hereinbefore explained, but is left somewhat sloping or inclined, it follows that if the said rod were turned over as it is fed inward the length of the blank would vary according as the gage-rod $d$ should strike one point or another on the said inclined end, whereas, by feeding the rod inward without turning it, as hereinbefore set forth, the said gage strikes always at the same point on the end thereof, and thus secures perfect uniformity in the length of the blanks, and consequently in the length of that portion thereof which projects forward from the heads B' of the slides C D and from which the head of the bolt is formed, as hereinbefore fully explained.

When it is desired to form a head upon the end of a rod, as in making a bolt of unusual length, the cutter F is made stationary and the adjustable block $e$ and gage-rod $d$ are removed. The end of the rod is passed into and through the recesses $a$ of the heads B' until it strikes the inner side of the said cutter, which thus acts as a stop or gage, to determine the length of rod projecting in front of the said heads B'. The rod is then grasped between the heads B' and acted upon by the other parts of the machine in the same manner as when the heads are formed upon shorter bolts, as hereinbefore described.

What I claim as new, and desire to secure by Letters Patent, is—

1. The combination of the clamping-heads B', gage $d$, and cutter F, arranged substantially as described, whereby the blank is gaged, cut off, and clamped between the said heads B', substantially as herein set forth.

2. The dies $f'$, in combination with the heading-dies and with the clamping-heads B, all arranged substantially as herein set forth, for the purpose specified.

3. The heading-dies $z'$ $z$ $w$, in combination with the clamping-heads B', and operating in succession, substantially as herein set forth, for the purpose specified.

4. The construction of the preparatory heading-die $z'$ with convex inner sides and acute or recess corners, substantially as herein set forth, for the purpose specified.

5. The vertically-sliding block M, furnished with suitable heading-dies, in combination with the horizontally-sliding block K and with the clamping-heads B', substantially as herein set forth, for the purpose specified.

6. The arrangement of the sliding bars G H, furnished at their inner ends with dies $f'$, the sliding bars G' I, and the cams G* I* in relation with each other and with the clamping-heads B', substantially as herein set forth, for the purpose specified.

7. The slide C', furnished with the inclined plane $f$, and arranged in relation with the cutter F, toggle-bar $d^*$, and slide C, substantially as herein set forth, for the purpose specified.

BENJ. WALKER.

Witnesses:
  HENRY GREENFIELD,
  J. W. COOMBS.